United States Patent
Moreno et al.

(10) Patent No.: US 11,895,081 B2
(45) Date of Patent: *Feb. 6, 2024

(54) DISTRIBUTED NETWORK ADDRESS TRANSLATION OVER NETWORK ENVIRONMENTS

(71) Applicant: Cisco Technology, Inc., San Jose, CA (US)

(72) Inventors: Victor Manuel Moreno, Carlsbad, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,952

(22) Filed: Feb. 9, 2022

(65) Prior Publication Data
US 2022/0174037 A1 Jun. 2, 2022

Related U.S. Application Data

(63) Continuation of application No. 16/685,969, filed on Nov. 15, 2019, now Pat. No. 11,265,289.

(51) Int. Cl.
*H04L 61/2575* (2022.01)
*H04L 12/46* (2006.01)
(Continued)

(52) U.S. Cl.
CPC ...... *H04L 61/2557* (2013.01); *H04L 12/4633* (2013.01); *H04L 12/4679* (2013.01);
(Continued)

(58) Field of Classification Search
CPC ............. H04L 61/2557; H04L 61/5038; H04L 12/4633; H04L 12/4679; H04L 51/04; H04L 61/2575; H04L 61/2592
See application file for complete search history.

(56) References Cited

U.S. PATENT DOCUMENTS 10,122,682 B1 * 11/2018 Salour ..................... H04M 3/54
10,218,597 B1 2/2019 Miller et al.
(Continued)

OTHER PUBLICATIONS

Klein, et al., "NAT Traversal for LISP Mobile Node", ACM ReArch 2010: Proceedings of the Re-Architecting the Internet Workshop, Nov. 2010, 6 pgs. (Year: 2010).*
(Continued)

*Primary Examiner* — Thu V Nguyen
*Assistant Examiner* — Angela M Widhalm De Rodriguez
(74) *Attorney, Agent, or Firm* — Lee & Hayes P.C.

(57) ABSTRACT

This disclosure describes techniques for implementing network address translation as a distributed service over the nodes of a logical network fabric, such as a software-defined network fabric. A method includes registering, by an edge node of a network, an IP address of a client device. The method further includes forwarding, by the edge node, the registered IP address to a control plane of the network. The method further includes checking, by the control plane, a network address translation policy. The method further includes recording, by the control plane, translations between the registered IP address and an allocated IP address in a translation table, each of the translations being related to the edge node. The method further includes returning, by the control plane, the translations between the registered IP address and the allocated IP address to the edge node.

20 Claims, 7 Drawing Sheets

(51) Int. Cl.
   *H04L 61/2592* (2022.01)
   *H04L 51/04* (2022.01)
   *H04L 61/5038* (2022.01)
   *H04L 61/2557* (2022.01)

(52) U.S. Cl.
   CPC .......... *H04L 51/04* (2013.01); *H04L 61/2575* (2013.01); *H04L 61/2592* (2013.01); *H04L 61/5038* (2022.05)

(56) References Cited

U.S. PATENT DOCUMENTS

| | | | |
|---|---|---|---|
| 10,237,235 B1* | 3/2019 | Dickinson | H04L 61/2517 |
| 2013/0185404 A1 | 7/2013 | Patel et al. | |
| 2015/0131651 A1* | 5/2015 | Tarricone | H04L 65/102 370/352 |
| 2017/0324702 A1* | 11/2017 | Lin | H04L 63/08 |
| 2018/0227186 A1 | 8/2018 | Olofsson | |
| 2019/0342212 A1* | 11/2019 | Sivasubramanian | H04L 67/10 |
| 2020/0099656 A1 | 3/2020 | Mittal et al. | |
| 2020/0322182 A1 | 10/2020 | Anshuman et al. | |
| 2021/0152516 A1 | 5/2021 | Moreno et al. | |

OTHER PUBLICATIONS

Klein, et al., "NAT Traversal for LISP Mobile Node", ACM ReArch 2010: Proceedings of the Re-Architecting the Internet Workshop, Nov. 2010, 6 pgs.

Office Action for U.S. Appl. No. 16/685,969, dated Oct. 26, 2020, Moreno, "Distributed Network Address Translation Over Network Environments ", 10 Pages.

Office Action for U.S. Appl. No. 16/685,969, dated Jul. 12, 2021, Moreno, "Distributed Network Address Translation Over Network Environments ", 9 pages.

* cited by examiner

DISTRIBUTED NETWORK ADDRESS TRANSLATION OVER NETWORK ENVIRONMENTS

RELATED APPLICATIONS

This application claims priority to and is a continuation of U.S. patent application Ser. No. 16/685,969, filed on Nov. 15, 2019, the entire contents of which are incorporated herein by reference.

TECHNICAL FIELD

The present disclosure relates generally to providing network address translation over certain network environments.

BACKGROUND

Network address translation (NAT) is commonly implemented to enable interconnecting Internet Protocol (IP) traffic between networks having mutually incompatible address spaces, such as a first network using a reserved block of private IP addresses and any number of other private networks using the same, or other reserved blocks, and/or public networks using public IP addresses. By RFC 1918, "Address Allocation for Private Internets," published by the Internet Engineering Task Force (IETF), the IP address blocks of 10.0.0.0-10.255.255.255, 172.16.0.0-172.31.255.255, and 192.168.0.0-192.168.255.255 are reserved for private networks. IP traffic originating from outside the first network may have destinations addressed using any IP address in public IP space, while IP traffic originating from the first network may have destinations addressed using only using reserved IP addresses in one of these private blocks.

Consequently, if traffic originating from outside the first network has a destination within the first network, or if traffic originating from a node within the first network has a destination outside the first network, the traffic must pass through a boundary between the first network and other networks. NAT is generally configured to modify destination addresses stored in the header of IP packets to an IP address compatible with a network on the outbound side of the boundary, so that the packets may proceed as normal to their destinations. Other forms of NAT may provide analogous services; for example, port address translation (PAT) may further translate destination ports stored in the header in addition to translating destination addresses.

Private networks may be represented by a single public IP address at a single gateway such that the reserved private IP addresses are not exposed, which would result in conflicts. A single gateway may be sufficient to perform NAT services for a small number of nodes physically interconnected to establish a private network. However, as network architecture becomes increasingly logical rather than physical, a logical network fabric plane may be established distributed over nodes across a large physical region. As such, a single gateway may be insufficient for network architectures, and NAT functionality may be extended; furthermore, new implementations of NAT may also be desirable.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
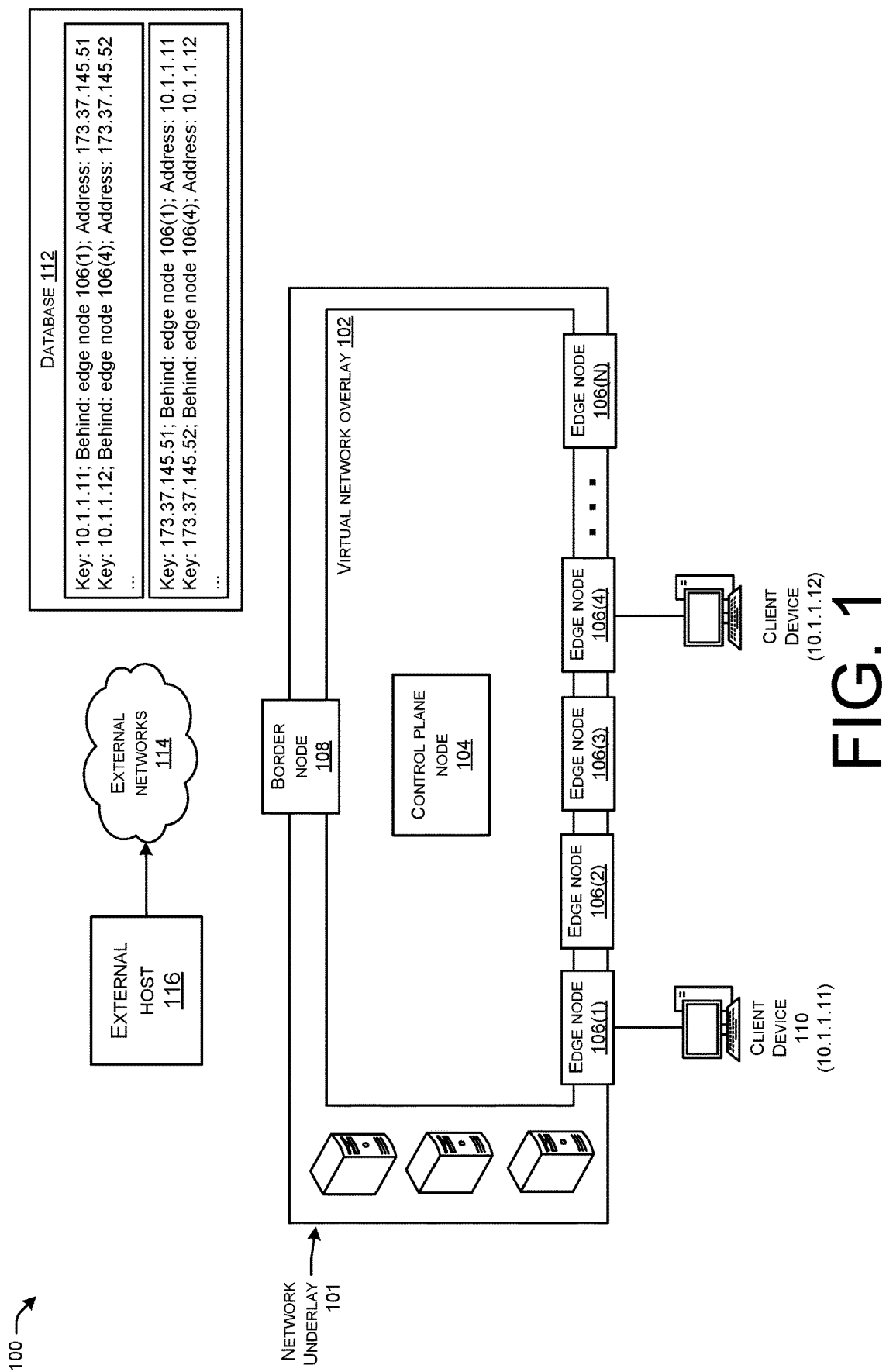
FIG. 1 illustrates a system-architecture diagram of an example network fabric in which edge nodes provide client devices with NAT services decentralized from the control plane node and distributed at each edge node.

This disclosure describes techniques for implementing network address translation as a distributed service over the nodes of a logical network fabric, such as a software-defined network fabric. A method includes registering, by an edge node of a network, an IP address of a client device. The method further includes forwarding, by the edge node, the registered IP address to a control plane of the network. The method further includes checking, by the control plane, a network address translation policy. The method further includes recording, by the control plane, translations between the registered IP address and an allocated IP address in a translation table, each of the translations being related to the edge node. The method further includes returning, by the control plane, the translations between the registered IP address and the allocated IP address to the edge node.

Additionally, another method includes receiving, by an edge node of a network, an outbound IP packet from a client device having a registered IP address at the edge node, the IP packet having a destination IP address outbound from the network. The method further includes translating, by the edge node, a source IP address of the outbound IP packet based on a translation from the registered IP address to an allocated IP address. The method further includes forwarding, by the edge node, the outbound IP packet to a border node of the network. The method further includes receiving, by the edge node, an inbound IP packet having the allocated IP address as a destination IP address. The method further includes translating, by the edge node, the destination IP address of the inbound IP packet based on a translation from the allocated IP address to the registered IP address. The method further includes forwarding, by the edge node, the inbound IP packet to the client device.

Additionally, the techniques described herein may be performed by a system and/or device having non-transitory computer-readable media storing computer-executable instructions that, when executed by one or more processors, performs the method described above.

Example Embodiments

Software-defined networking enables physical network nodes and computing resources to operate on a distributed basis as a common logical network infrastructure. Such techniques are increasingly used to increase computing and networking capacity and availability. An example of software-defined networking is Software-Defined Access ("SD-Access") from CISCO SYSTEMS INC. of San Jose, California. According to examples of software-defined networking such as SD-Access, a virtual network overlay may be defined across physical network nodes, the virtual network overlay logically unifying the computing resources of the physical network nodes to provide a variety of network services and network communication policies, while the physical nodes act as an underlay providing network traffic throughput and forwarding. An overlay and an underlay may be referred to in combination as a network fabric, which is an example architecture of a network as described in examples of the present disclosure.

The implementation of a network fabric according to examples of the present disclosure may include edge nodes which provide entry points for client devices to connect to the network fabric and access services and policies. Edge nodes may be virtual nodes delineating a logical parameter of the network fabric, without limitation as to their physical locations.

The implementation of a network fabric according to examples of the present disclosure may include border nodes which connect the network fabric to one or more outside networks. Outside networks may be one or more similar networks according to examples of the present disclosure, such as other network fabrics. Outside networks may be one or more traditional networks implemented by physical architecture. Outside networks may be one or more public or private local- or wide-area networks, or the Internet. Border nodes may be configured to connect to hosts outside the network fabric and forward outbound network traffic to those outside hosts, and to provide gateways to receive inbound network traffic from those hosts. Border nodes may be virtual nodes delineating a logical border of the network fabric with other networks, without limitation as to their physical locations.

The implementation of a network fabric according to examples of the present disclosure may include a fabric control plane node. The fabric control plane node may provide a logical storage which records client devices that have connected to the network fabric.

The implementation of a network fabric according to examples of the present disclosure may include intermediate nodes. Intermediate nodes may provide forwarding and interconnections between edge nodes, border nodes, and control plane nodes. For the purpose of this disclosure, intermediate nodes may be presumed to be present in the network fabric for the performance of these functions without further reference thereto henceforth.

Data may be transported across the network fabric by a logical data plane implemented by encapsulation, such as VXLAN tunneling technology. For example, for IP packets to be forwarded between edge nodes, or between an edge node and a border node, a VXLAN header may be added to the IP packet to enable the encapsulated packet to be transported between edge nodes, or between an edge node and a border node, by VXLAN tunneling.

The implementation of a network fabric according to examples of the present disclosure may logically establish a private subnet and a public subnet. The private subnet may be allocated a block of private IP addresses, and assignment of private subnet addresses to nodes of the network fabric as NAT addresses may enable nodes of the network to be identified and traffic to be internally routed to the nodes of the network. The public subnet may be allocated a block of public IP addresses, and inbound network traffic from hosts outside the network may be addressed to the prefix of the public subnet addresses. Based on the least-significant bits of the destination IP addresses of inbound network traffic, network address translation (NAT) may be implemented to translate private subnet addresses to public subnet addresses for outbound traffic from the network fabric, and to translate public subnet addresses to private subnet addresses for inbound traffic into the network fabric.

An entity such as an enterprise service provider may deploy a software-defined network across physical nodes distributed over a large physical space, such as throughout a building such as an office or warehouse, or public space such as a stadium, convention center, public road deployed with vehicle-to-infrastructure (V2I)-equipped "smart" infrastructure, and the like. The network may be deployed to provide network-enabled services and policy access to users of the entity's services, such as customers or employees of the entity or members of the general public attending a public space. Users may be physically mobile within the physical space, and it may be desirable to allow users to access, and maintain persistent access to, the network-enabled services and policies from a mobile client device through a wireless connection while moving about the physical space. A client device according to examples of this disclosure may be any mobile computing device having a network interface, such as a wireless network interface. Examples include mobile phones, tablets, Internet of Things devices, smart speakers, projectors, handheld Internet-connected terminals, smartwatches, wearable devices, appliances, automobiles, and the like. A client device which connects to the network fabric may become an endpoint of the network.

The network fabric may be deployed by enterprises to provide users, such as employees of a business or visitors to an event, with access to internal networks to the network fabric and access to external networks such as the Internet.

To allow users to access network services while remaining mobile, endpoint client devices of users may connect to the network from any edge node in the network, and outbound traffic from and inbound traffic to the endpoint client device may be forwarded through each edge node in accordance with the edge node to which the endpoint client device is connected to. However, it would not be desirable for users to be required to re-negotiate service and policy protocols, such as assignment of user identity, IP addresses, and the like, while moving about the physical space and connecting to different edge nodes, and thereby lose continuity of network services or policies as a result. Consequently, a control plane node may maintain one or more databases indicating which edge node a particular client device is connected to, and update these databases as the client device connects to different edge nodes as a result of physical movement.

However, it is desirable to implement some per-client-device services and policies at individual edge nodes, rather than at the control plane node, in order to decentralize services, reduce latency, and increase utilization and distribution of the computing resources provided by the underlay. According to examples of the present disclosure, NAT may be a service provided to individual client devices by a network fabric for access to external hosts and external networks through the network fabric. Therefore, examples of the present disclosure implement decentralized NAT services at edge nodes of a network fabric, so that NAT may be performed on outbound network traffic originating from a client device before the outbound traffic is encapsulated and forwarded to a border node, all at the edge node without the edge node needing to communicate with a control plane node.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network fabric 100 in which edge nodes provide client devices with NAT services decentralized from the control plane node and distributed at each edge node.

In some examples, networking resources of a network fabric 100 may be a collection of physical nodes located across geographic areas forming a network underlay 101, over which a virtual network overlay 102 is logically defined. The network overlay 102 utilizes the resources of the network fabric to implement a control plane based at a control plane node 104, which, being a logically defined node, may be distributed over one or many physical nodes of the underlay. The network overlay 102 utilizes the resources of the network to implement a data plane interconnecting edge nodes 106(1)-106(N) where N is any integer greater than "1" and at least one border node 108. The virtual network overlay 102 may be a distributed network through which a user may connect, via a client device 110, to any of edge nodes 106(1)-106(N) to interact with services and policies implemented on the network fabric 100. While a client device 110 is connected to the network fabric 100 in this manner, the client device 110 is an endpoint of the network fabric.

The network fabric 100 may provide, via connections to any edge node 106(1)-106(N), access to internal networks hosted in the network fabric 100 and/or access to external networks 114, including other network fabrics and public networks such as the Internet, through on-demand availability of networking resources, such as routing, forwarding, a data plane established by encapsulation, etc. In some examples, the network fabric 100 may be managed and maintained by a service provider hosting various services accessible on the network fabric 100 and defining various policies which govern use and availability of these services. Generally, a user and a client device 110 of the user may be mobile while connected to the network fabric 100, and thus the connection of the client device 110 to the virtual network overlay 102 may roam amongst each of the edge nodes 106(1)-106(N).

The control plane node 104 may host a database 112 which tracks endpoint client devices 110 by a subnet address assigned to the endpoint client device 110. The subnet address may be an address having a prefix allocated to a subnet of the network fabric 100, and may be assigned to the endpoint client device 110 as a NAT address by mapping the subnet address to a device IP address by which the client device 110 identifies itself. The NAT address may be mapped to the device IP address by implementation of protocols between the endpoint client device 110 and the control plane node 104 such as, for example, a Locator/ID Separation Protocol (LISP). Based on common LISP implementations, the device IP address may be an Endpoint ID (EID) of the client device 110, and the private NAT address may be a Routing LOCator (RLOC) assigned to the client device 110. In accordance with LISP implementations, in an IP packet having the client device 110 as a destination, the EID of the client device 110 may be the destination IP address in the innermost header layer of the packet. The control plane node 104 may record in the database 112 a mapping from an EID of a client device 110 to an RLOC of the client device 110. For the purpose of tracking the endpoint client device 110, the mapping may be further associated with a particular one of the edge nodes 106(1)-106(N) to which the endpoint client device 110 is connected, also referred to as the edge node which the endpoint client device 110 is "behind."

Whenever a client device 110 connects to one of the edge nodes 106(1)-106(N), the client device 110 may conduct a LISP registration for an EID of the client device 110 through the respective edge node with the control plane node 104, causing the control plane node 104 to assign a NAT address as an RLOC of the client device 110, and record a mapping from the EID of the client device 110 to the RLOC of the client device 100 in the database 112 in association with one of the edge nodes 106(1)-106(N) which the endpoint client device 110 is behind. Every subsequent LISP registration of the client device 110 having the same EID at a different edge node of the edge nodes 106(1)-106(N) may cause the control plane node 104 to update the edge node which the endpoint client device 110 is behind in the registration of the EID of the endpoint client device 110.

For the purpose of forwarding traffic between the endpoint client device 110 and a host in the fabric node 100, a LISP registration of the client device 110 may map an EID of the client device 110 to an RLOC which is a private NAT address. For the purpose of forwarding traffic between the endpoint client device 110 and a host outside the fabric node 100, a LISP registration of the client device 110 may map an EID of the client device 110 to an RLOC which is a public NAT address. A mapping of the EID to an RLOC which is a public NAT address may necessitate NAT to be performed upon IP packets of the inbound and outbound traffic to and from the client device 110 so that the traffic may be routed correctly.

In accordance with LISP implementations, the edge nodes 106(1)-106(N) and the border node 108 may each be both an ingress tunnel router (ITR) and an egress tunnel router (ETR) of the network fabric 100; according to LISP nomenclature each of these nodes may be referenced as an xTR, denoting their status as both ITRs and ETRs.

Therefore, the techniques described herein include a protocol for LISP registration transactions between an endpoint client device 110 and a control plane node 104 of a network fabric 100, the control plane node 104 recording in a database 112 mappings between a device address of the client device 110 and a NAT address assigned by the control plane node 104, the mappings being operative to enable any xTR of the network fabric 100, including edge nodes 106(1)-106(N) to which the client device 110 has connected and the border node 108, to perform NAT on IP packets inbound to or outbound from the client device 110. The techniques described herein further include any of the edge nodes 106(1)-106(N) performing source network address translation (SNAT) on IP packets outbound from the client device 110 through the network fabric 100 to a host outside the network fabric 100. The techniques described herein further include a border node 108 performing destination network address translation (DNAT) on IP packets inbound to the client device 110 from a host outside the network fabric 100 through the network fabric 100.

Figure 2:
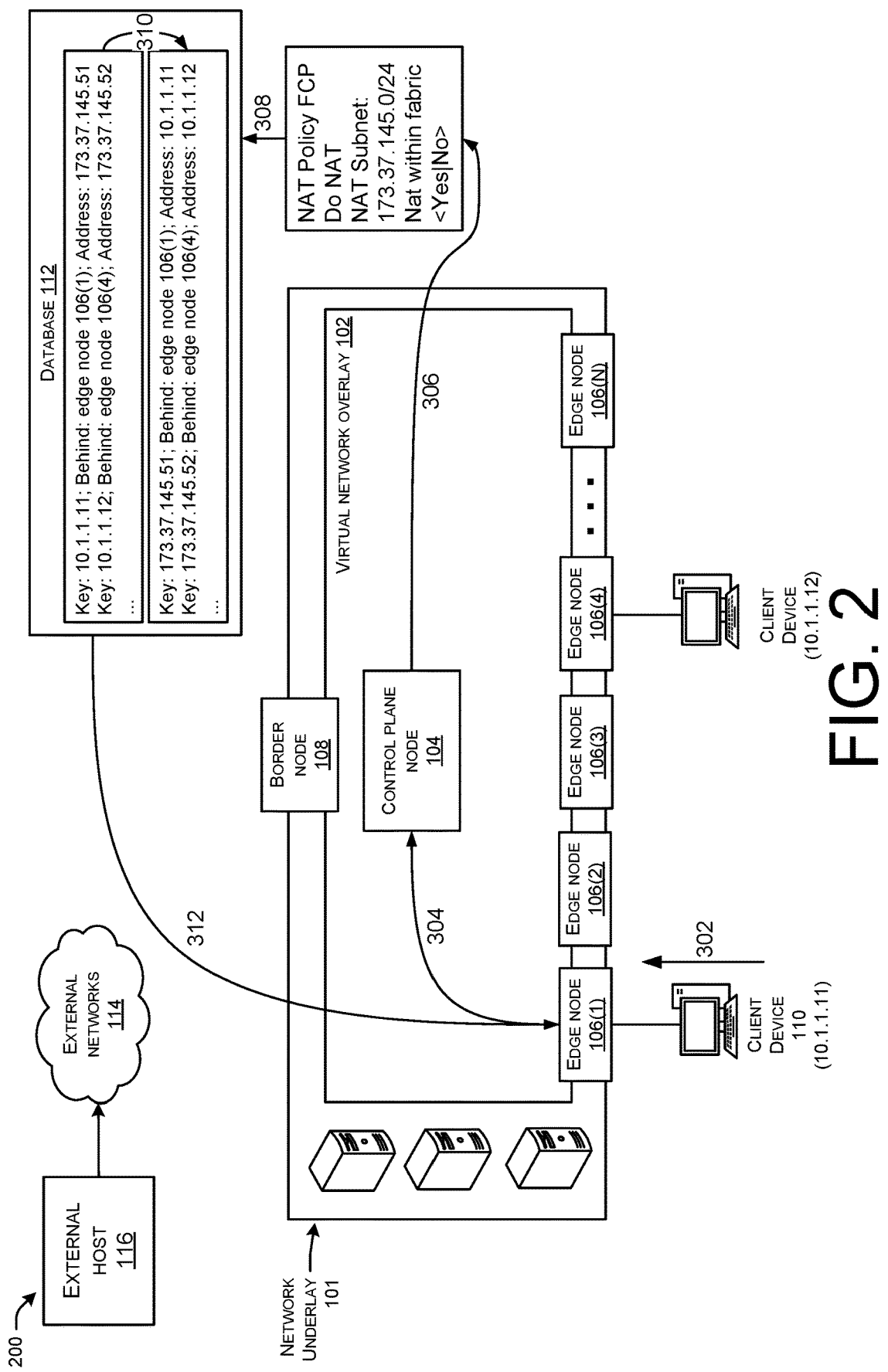
FIG. 2 illustrates a diagram of an example flow for a LISP registration transaction between an endpoint client device and a control plane node of a network fabric; any of the edge nodes performing SNAT on IP packets outbound from the client device to a host outside the network fabric; and a border node performing DNAT on IP packets inbound to the client device from a host outside the network fabric.

FIG. 2 illustrates a diagram 200 of an example flow for a LISP registration transaction between an endpoint client device 110 and a control plane node 104 of a network fabric 100 (as described subsequently with reference to method 300 as an example); any of the edge nodes 106(1)-106(N) performing SNAT on IP packets outbound from the client device 110 to a host outside the network fabric 100 (as described subsequently with reference to method 400 as an example); and a border node 108 performing DNAT on IP packets inbound to the client device 110 from a host outside the network fabric 100 (as described subsequently with reference to method 500 as an example). As shown, the control plane node 104 may generate a database 112 of mappings from a device address of a client device 110 to a NAT address assigned to the client device 110 (wherein the device address is a key and the NAT address is a value in, for example, a key-value mapping), and mappings from the NAT address assigned to the client device 100 to the device address of the client device 110 (wherein the NAT address is a key and the device address is a value in, for example, a key-value mapping). The control plane node 104 may store the database 112 at logically defined storage of the control plane node 104, which may be distributed over any number of physical nodes of the underlay of the network fabric 100. Individual mappings may further be stored at the edge nodes 106(1)-106(N) as will be described below.

In some examples, the mappings recorded in the database 112 may indicate to which edge node among edge nodes 106(1)-106(N) a tracked client device 110 is currently connected to. For instance, the mappings recorded in the database 112 may have identities of respective edge nodes associated therewith.

To identify a mapping for a source IP address in an outbound IP packet, the source IP address may be looked up among keys of mappings. A key matching the source IP address may be found among the mappings. A subnet IP address to which the matching key is mapped may be identified. A determination may be made that the source IP address in the outbound IP packet should be translated to a subnet IP address to which the source IP address is mapped. According to examples, these steps may be performed by any node of the virtual network overlay 102 having access to mappings recorded in the database 112, including all xTRs in the virtual network overlay 102.

To identify a mapping for a destination IP address in an inbound IP packet, the destination IP address may be looked up among keys of mappings. A key matching the destination IP address may be found among the mappings. A device IP address to which the matching key is mapped may be identified. A determination may be made that the destination IP address in the inbound IP packet should be translated to a device IP address to which the destination IP address is mapped. According to examples, these steps may be performed by any edge node of the virtual network overlay 102 having knowledge of mappings recorded in the database 112, which may include any xTRs in the virtual network overlay 102.

Figure 3:
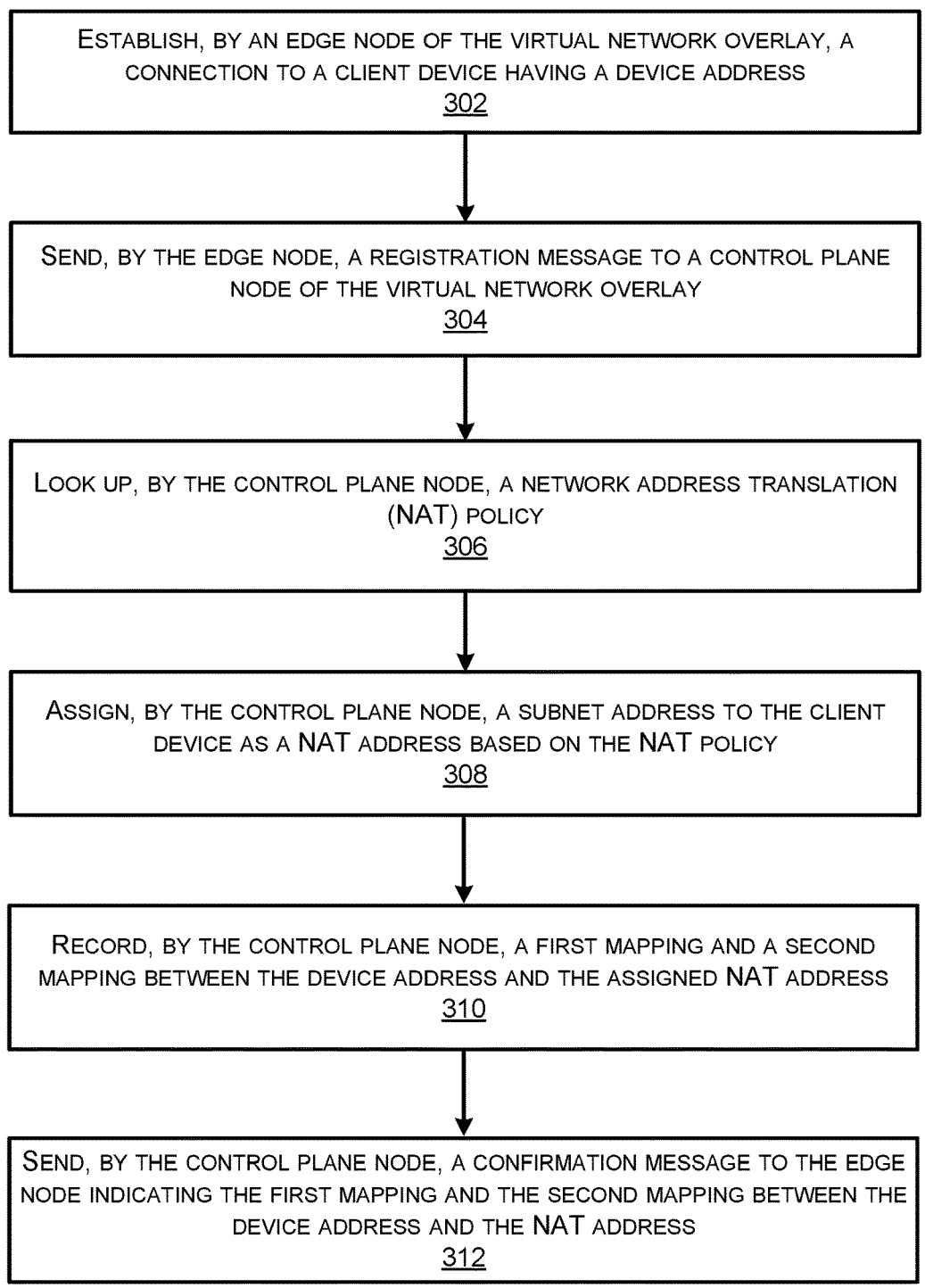
FIG. 3 illustrates a flow diagram of an example method for registering mappings between a device address of a client device connected to a network fabric and a NAT address assigned to the client device by a control plane node of the network fabric.
Figure 4:
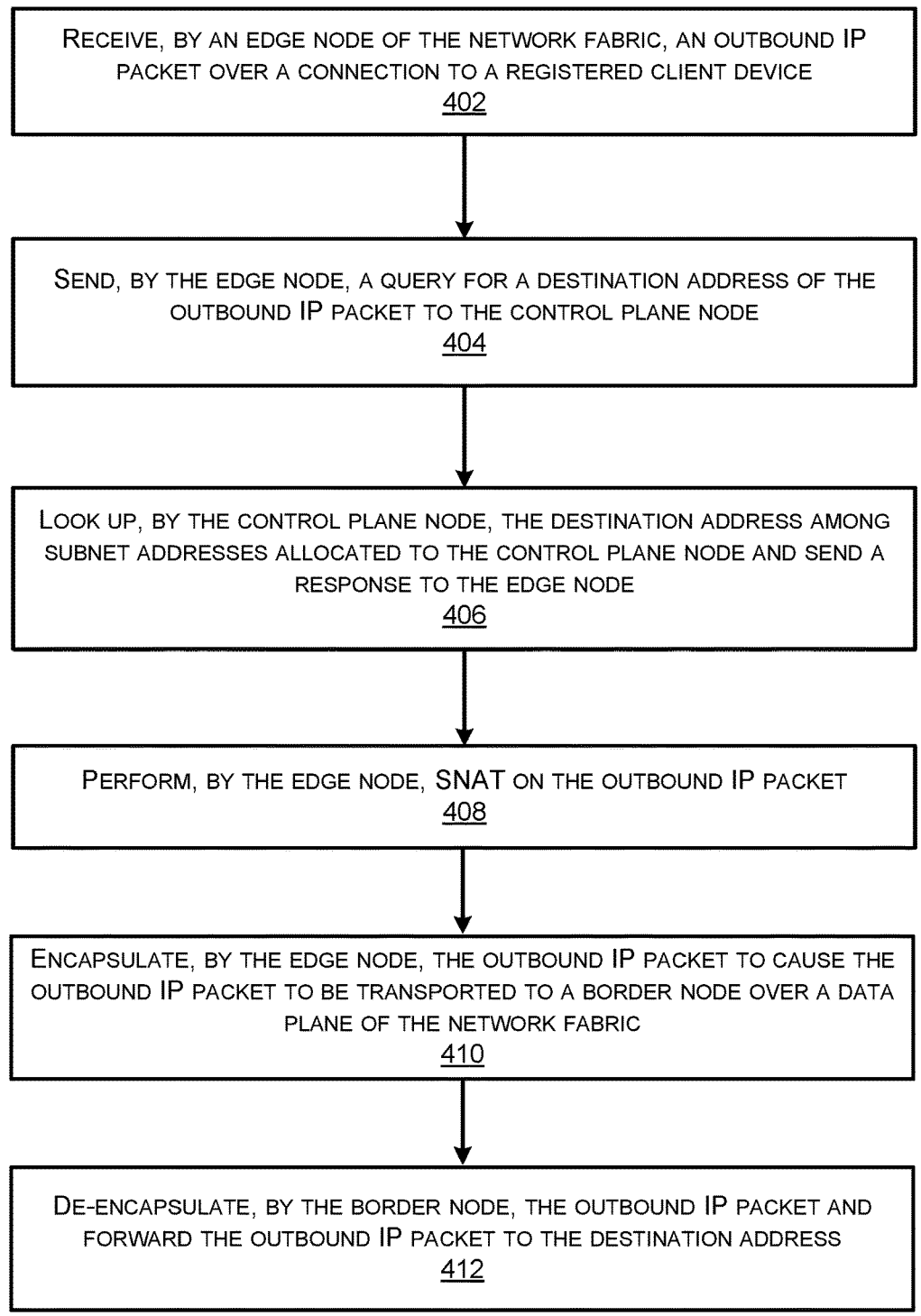
FIG. 4 illustrates a flow diagram of an example method for an edge node of a network fabric to perform source network address translation on IP packets outbound from a registered client device connected to the edge node to a host outside the network fabric.
Figure 5:
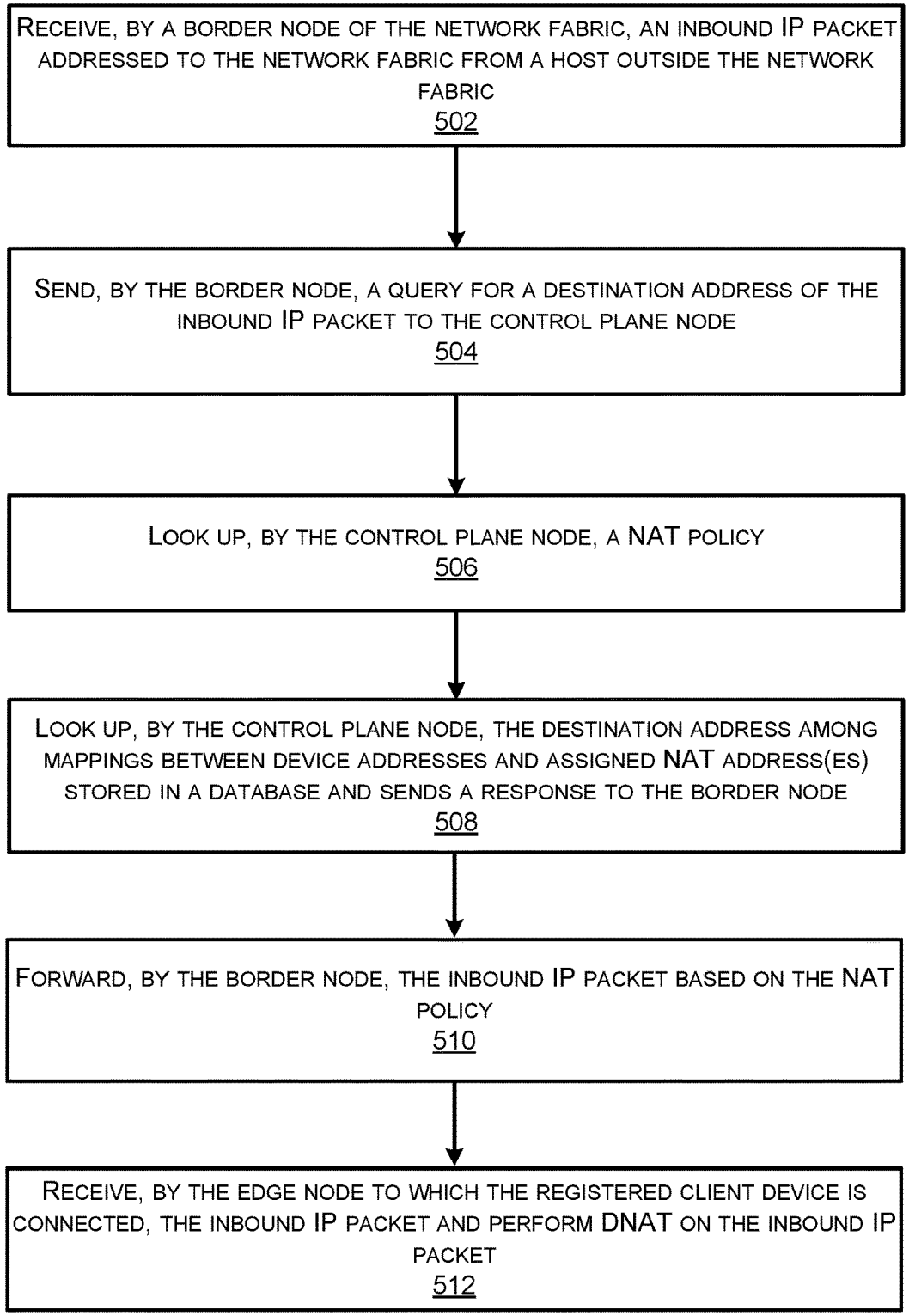
FIG. 5 illustrates a flow diagram of an example method for an edge node of a network fabric to perform destination network address translation on IP packets inbound to a registered client device connected to the edge node from a host outside the network fabric.

FIGS. 3, 4, and 5 illustrate flow diagrams of example methods 300, 400, and 500 that illustrate aspects of the functions performed at least partly by the network fabric 100 as described in FIGS. 1-2. The logical operations described herein with respect to FIGS. 3, 4, and 5 may be implemented (1) as a sequence of computer-implemented acts or program modules running on a computing system, such as a network node, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic (which may virtualize physical hardware into one or more logical computing systems), and any combination thereof. It should also be appreciated that more or fewer operations might be performed than shown in the FIGS. 3, 4, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for registering mappings between a device address of a client device 110 connected to a network fabric 100 and a NAT address assigned to the client device 110 by a control plane node 104 of the network fabric. The method may be executing on one or more processors of a virtual network overlay 102 logically defined over a physical hardware underlay. The virtual network overlay 102 may comprise one or more processors and one or more non-transitory computer-readable media storing computer-executable instructions that, when executed by the one or more processors, cause the one or more processors to perform the method 300.

At 302, an edge node of the edge nodes 106(1)-106(N) of the virtual network overlay 102 establishes a connection to a client device 110. In the example of FIG. 2, the edge node may be edge node 106(1), for illustrative purposes. The edge node 106(1) may receive a connection request from the client device 110 which includes a device address of the client device 110, which, for illustrative purposes in the example of FIG. 2, may be 10.1.1.11. The edge node 106(1) may thus learn the client device 110 by its device address. The edge node 106(1) learning the client device 110 may be independent of any other edge node among edge nodes 106(1)-106(N) learning the client device. This is to say, any number of edge nodes 106(1)-106(N) may learn the client device 110 while other edge nodes have not learned the client device 110, and they may learn the client device 110 in any order as a result of the client device 110 connecting to any number of the edge nodes 106(1)-106(N) in any order. This may result from the connection of the client device 110 to the virtual network overlay 102 roaming amongst each of the edge nodes 106(1)-106(N) as described above.

At 304, the edge node sends a registration message to a control plane node 104 of the virtual network overlay 102. The registration message may indicate that the edge node 106(1), for example, has registered the client device 110, and may include the device address of the client device 110, such as 10.1.1.11. The registration message may be consistent with, for example, implementation of a registration request by an ETR for an EID according to LISP.

At 306, the control plane node 104 looks up a NAT policy. A NAT policy may be preset in accordance with configuration by an entity such a service provider hosting services available on the network fabric 100, and may be stored at the control plane node 104. A NAT policy may specify types of traffic to which NAT should be applied by subnet. A NAT policy may specify a subnet for assigning subnet addresses as NAT addresses (such as, in this case, from the public subnet 173.37.145.0/24).

For example, a first type of NAT policy may specify that NAT should be applied to traffic between hosts addressed by private NAT addresses of the network fabric 100 (or, alternatively, any subnet addresses not registered by LISP at an edge node and/or a control plane node 104) and hosts outside the network fabric 100. As another example, a second type of NAT policy may specify that NAT should be applied to traffic between hosts addressed by private NAT addresses of the network fabric 100 (or, alternatively, any subnet addresses not registered by LISP at an edge node and/or a control plane node 104) and hosts outside the network fabric 100, as well as traffic among hosts addressed by private NAT addresses of the network fabric 100. It should be understood that whereas traffic with hosts outside the network fabric 100 may require NAT to be transported from the network fabric 100 to outside the network fabric 100, traffic between private NAT addresses of the network fabric 100 may not require NAT to be transported among nodes of the network fabric 100, and thus a NAT policy of the second type may be optional for implementing the network fabric 100. It should also be understood that a NAT policy defined by known subnets may be preferable when, for example, subnets driving traffic through the network fabric 100 are known, while a NAT policy defined by unregistered subnet addresses may be preferable when traffic from a mix of sources, including unknown sources, is expected. Defining NAT policies based on known subnets may improve efficiency of network processing when the service provider is able to predict known subnets from which traffic requiring NAT will originate.

At 308, the control plane node 104 assigns a NAT address to the registered client device 110 based on the NAT policy. For example, based on the first type of NAT policy as described above, the control plane node 104 may assign a public NAT address to the registered client device 110. Based on the second type of NAT policy as described above, the control plane node 104 may assign a public NAT address to the registered client device 110 and assign a private NAT address to the registered client device 110.

For illustrative purposes, in the example of FIG. 2, the NAT policy is a first type of NAT policy, and the control plane node 104 assigns the public NAT address 173.37.145.51 (from the public subnet 173.37.145.0/24) to the registered client device 110.

In the event that the registered client device 110 previously connected to another of the edge nodes 106(1)-106(N) and has roamed to connect to another of the edge nodes 106(1)-106(N), the control plane node 104 may have already assigned a NAT address to the registered client device 110. The control plane node 104 may determine this by looking up the device address of the registered client device 110 in a database 112, as referenced below. In this case, step 308 may be skipped, or the control plane node 104 may assign another NAT address to the registered client device 110.

At 310, the control plane node 104 records a first mapping and a second mapping between the device address and the assigned NAT address. The first mapping may be a mapping from the device address as a key to the assigned NAT address. The second mapping may be a mapping from the assigned NAT address as a key to the device address. Each of the first mapping and the second mapping may be further associated with the particular one of the edge nodes 106(1)-106(N) to which the registered client device 110 is connected (in this case, edge node 106(1)), also referred to as the edge node which the registered client device 110 is "behind." The control plane node 104 may record the first mapping and the second mapping both in the database 112.

For illustrative purposes, in the example of FIG. 2, the control plane node 104 maps the device address of 10.1.1.11 to the public NAT address of 173.37.145.51, and maps the public NAT address of 173.37.145.51 to the device address of 10.1.1.11.

In the event that the registered client device 110 previously connected to another of the edge nodes 106(1)-106(N) and has roamed to connect to another of the edge nodes 106(1)-106(N), a mapping from the device address to a previously assigned NAT address and a mapping from a previously assigned NAT address to the device address may already be recorded in the database 112. In the event that another NAT address was assigned to the registered client device in step 308, the control plane node 104 recording the first mapping may refer to the control plane node 104 overwriting the mapping from the device address to the previously assigned NAT address with the first mapping, and the control plane node 104 recording the second mapping may refer to the control plane node 104 overwriting the mapping from the previously assigned NAT address to the device address with the second mapping. In the event that step 308 was skipped, the control plane node 104 recording the first mapping may refer to the control plane node 104 merely overwriting the edge node associated with the first mapping with the edge node 106(1)-106(N) to which the registered client device 110 is currently connected (in this case, edge node 106(1)), and the control plane node 104 recording the second mapping may refer to the control plane node 104 merely overwriting the edge node associated with the second mapping with the edge node 106(1)-106(N) to which the registered client device 110 is currently connected (in this case, edge node 106(1)).

At 312, the control plane node 104 sends a confirmation message to the edge node indicating mapping between the device address and the NAT address. Thus, the edge node (in this case, edge node 106(1)) may subsequently have knowledge of the first mapping from the device address to the NAT address and the second mapping from the NAT address to the device address.

For illustrative purposes, in the example of FIG. 2, the edge node 106(1) has knowledge that the device address of 10.1.1.11 is mapped to the public NAT address of 173.37.145.51, and the public NAT address of 173.37.145.51 is mapped to the device address of 10.1.1.11.

FIG. 4 illustrates a flow diagram of an example method 400 for an edge node 106(1)-106(N) of a network fabric 100 to perform source network address translation on IP packets outbound from a registered client device 110 connected to the edge node to a host outside the network fabric 100. The method may be executing on one or more processors of a virtual network overlay 102 logically defined over a physical hardware underlay. The virtual network overlay 102 may comprise one or more processors and one or more non-transitory computer-readable media storing computer-executable instructions that, when executed by the one or more processors, cause the one or more processors to perform the method 400.

At 402, an edge node of the edge nodes 106(1)-106(N) of the network fabric 100 receives, over a connection to the registered client device 110, an outbound IP packet. In general, the outbound IP packet may be addressed to a host outside the network fabric 100 or addressed to a host within the network fabric 100. For illustrative purposes, according to the example of FIG. 2, the outbound IP packet may be addressed to 8.8.8.8, a public IP address of a host 116 on the Internet. This disclosure will assume that the outbound IP packet is addressed to a host 116 outside the network fabric 100, but will describe related outcomes of the method 400 in the event that the inbound IP packet is addressed to a host within the network fabric 100, where this would assist with understanding.

In the example of FIG. 4, the edge node to which the registered client device 110 is connected may be edge node 106(1), for illustrative purposes.

At 404, the edge node sends a query for a destination address of the outbound IP packet to the control plane node 104. The query may request the control plane node 104 to respond as to whether the destination address is within the network fabric 100 or outside the network fabric 100.

At 406, the control plane node 104 looks up the destination address among subnet addresses allocated to the control plane node 104 and sends a response to the edge node. The response may indicate whether the destination address is within the network fabric 100 or outside the network fabric 100. For example, since the destination address 8.8.8.8 is a public IP address for a third-party host, it is not among subnet addresses allocated to the control plane node 104. Therefore, the control plane node 104 sends a response to the edge node indicating that the destination address is outside the network fabric 100. Alternatively, if the destination address is found among subnet addresses allocated to the control plane node 104, the control plane node 104 sends a response to the edge node indicating that the destination address is within the network fabric 100.

At 408, the edge node performs SNAT on the outbound IP packet. This is performed in accordance with the outcome wherein the response received from the control plane node 104 indicates that the destination address is outside the network fabric 100. In the case that the response indicated that the destination address is within the network fabric 100, this step may not be performed.

The edge node may perform SNAT on the outbound IP packet may replacing a source address in the outbound IP packet, the source address being the device address of the registered client device 110, with an assigned NAT address to which the device address is mapped. The edge node may have knowledge of the mapping from the device address to the assigned NAT address in accordance with the method 300 as described above.

For illustrative purposes, according to the example of FIG. 2, the edge node replaces the source address of 10.1.1.11 with the assigned NAT address of 173.37.145.51.

At 410, the edge node encapsulates the outbound IP packet to cause the outbound IP packet to be transported to a border node 108 over a data plane of the network fabric 100. The edge node may, for example, encapsulate the outbound IP packet with a VXLAN header to enable the encapsulated packet to be transported over the data plane by VXLAN tunneling. In the case that the response indicated that the destination address is within the network fabric 100, the edge node may instead forward the outbound IP packet to the destination address within the network fabric 100 (assuming this is permitted without NAT by the NAT policy), completing the steps of the method 400.

At 412, the border node 108 de-encapsulates the outbound IP packet and forwards the outbound IP packet to the destination address. Forwarding the outbound IP packet to the destination address (in this case, 8.8.8.8) may proceed according to established network protocols which shall not be reiterated herein.

FIG. 5 illustrates a flow diagram of an example method 500 for an edge node 106(1)-106(N) of a network fabric 100 to perform destination network address translation on IP packets inbound to a registered client device 110 connected to the edge node from a host outside the network fabric 100. The method may be executing on one or more processors of a virtual network overlay 102 logically defined over a physical hardware underlay. The virtual network overlay 102 may comprise one or more processors and one or more non-transitory computer-readable media storing computer-executable instructions that, when executed by the one or more processors, cause the one or more processors to perform the method 400.

At 502, a border node 108 of the network fabric 100 receives an inbound IP packet addressed to the network fabric 100 from a host outside the network fabric 100. For illustrative purposes, according to the example of FIG. 2 and continuing the example of the method 400, the inbound IP packet may originate from the public address 8.8.8.8. The inbound IP packet may be addressed to a public subnet address allocated to the network fabric 100. For illustrative purposes, according to the example of FIG. 2, the inbound IP packet may be addressed to 173.27.145.51.

At 504, the border node 108 sends a query for a destination address of the inbound IP packet to the control plane node 104. The query may request the control plane node 104 to identify an endpoint to which the destination address is mapped within the network fabric. In general, the border node 108 may not be able to identify an endpoint to which a public NAT address is mapped within the network fabric 100 if the border node 108 has not recently received other packets addressed to the same destination address, whereas the border node 108 may have cached the destination address and the endpoint that it identifies if the border node 108 has recently handled other packets addressed to the same destination address.

At 506, the control plane node 104 looks up a NAT policy. NAT policies are generally as described above with reference to step 306 of method 300.

At 508, the control plane node 104 looks up the destination address among mappings between device addresses and assigned NAT address(es) stored in a database and sends a response to the border node 108. The response may indicate a device address of a registered client device 110 which is mapped to the destination address, identify an edge node of the network fabric 100 to which the registered client device 110 is connected, and identify a NAT policy. For example, since the destination address 173.27.145.51 is was mapped to the device address 10.1.1.11 in the method 400, the control plane node 104 determines that the destination address in the query is mapped to the registered client device 110 having the device address 10.1.1.11, and determines that the registered client device 110 is connected to edge node 106(1). Therefore, the control plane node 104 sends a response to the border node 108 indicating the device address 10.1.1.11, identifying the edge node 106(1), and identifying the NAT policy.

At 510, the border node 108 forwards the inbound IP packet based on the NAT policy. For example, if the NAT policy permits traffic between subnets of the network fabric 100 without NAT, the border node 108 may forward the inbound IP packet directly to the device address (in this case, 10.1.1.11), completing the steps of the method 500. If the NAT policy requires NAT for traffic between subnets of the network fabric 100, the border node may encapsulate the inbound IP packet with a VXLAN header to enable the encapsulated packet to be transported over the data plane to the edge node to which the registered client device 110 (in this case, edge node 106(1)) by VXLAN tunneling, and the method 500 may proceed to step 512.

At 512, the edge node to which the registered client device 110 is connected receives the inbound IP packet and performs DNAT on the inbound IP packet. The edge node may perform DNAT on the inbound IP packet may replacing a destination address in the inbound IP packet, the destination address being the assigned NAT address of the registered client device 110, with a device address to which the assigned NAT address is mapped. The edge node may have knowledge of the mapping from the assigned NAT address to the device address in accordance with the method 300 as described above.

For illustrative purposes, according to the example of FIG. 2, the edge node replaces the destination address of 173.37.145.51 with the device address of 10.1.1.11.

Figure 6:
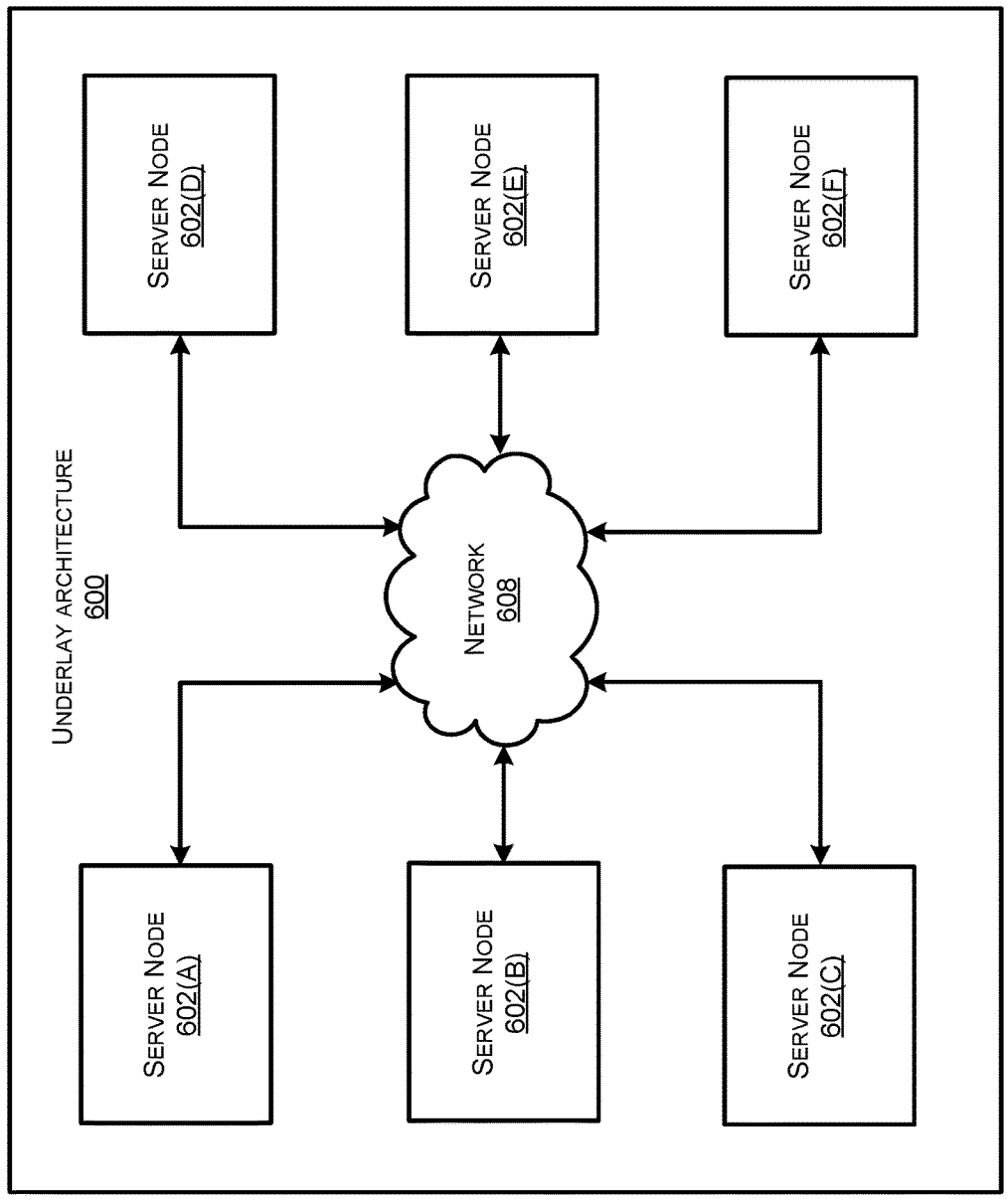
FIG. 6 is a computing system diagram illustrating a configuration for a network architecture that can be utilized to implement aspects of the technologies disclosed herein.

FIG. 6 is a computing system diagram illustrating a configuration for an underlay architecture 600 that can be utilized to implement aspects of the technologies disclosed herein. The example underlay architecture 600 shown in FIG. 6 includes several server nodes 602A-602F (which might be referred to herein singularly as "a server node 702" or in the plural as "the server nodes 602") for providing computing resources. In some examples, the resources and/or server nodes 602 may include, or correspond to, the network nodes making up the underlay described herein.

The server nodes 602 can be standard tower, rack-mount, or blade server computers configured appropriately for providing the computing resources described herein. As mentioned above, the computing resources provided by the virtual network overlay 102 can be data processing resources such as VM instances or hardware computing systems, database clusters, computing clusters, storage clusters, data storage resources, database resources, networking resources, and others. Some of the server nodes 602 can also be configured to execute a resource manager capable of instantiating and/or managing the computing resources. In the case of VM instances, for example, the resource manager can be a hypervisor or another type of program configured to enable the execution of multiple VM instances on a single server node 602. Server nodes 602 in the underlay architecture 600 can also be configured to provide network services and other types of services.

In the example underlay architecture 600 shown in FIG. 6, an appropriate network such as a LAN or WAN 608 is also utilized to interconnect the server nodes 602A-602F to form the network underlay. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the server nodes 602A-602F in the underlay architecture 600, and, potentially, between computing resources in each of the server nodes 602. It should be appreciated that the configuration of the underlay architecture 600 described with reference to FIG. 6 is merely illustrative and that other implementations can be utilized.

In some instances, the virtual network overlay 102 may provide computing resources, like VM instances and storage, on a permanent or an as-needed basis. Among other types of functionality, the computing resources provided by the virtual network overlay 102 may be utilized to implement the various services described above. The computing resources provided by the virtual network overlay 102 can include various types of computing resources, such as data processing resources like VM instances, data storage resources, networking resources, data communication resources, network services, and the like.

Each type of computing resource provided by the virtual network overlay 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The virtual network overlay 102 can also be configured to provide other types of computing resources not mentioned specifically herein.

The computing resources provided by the virtual network overlay 102 may be enabled in one embodiment by one or more underlay architectures 600 located over a physical space to provide a network underlay as described above. The underlay architectures 600 may be housed in spaces to operate computer systems and associated components, typically including redundant and backup power, communications, cooling, and security systems. The underlay architectures 600 can also be located in geographically disparate locations.

Figure 7:
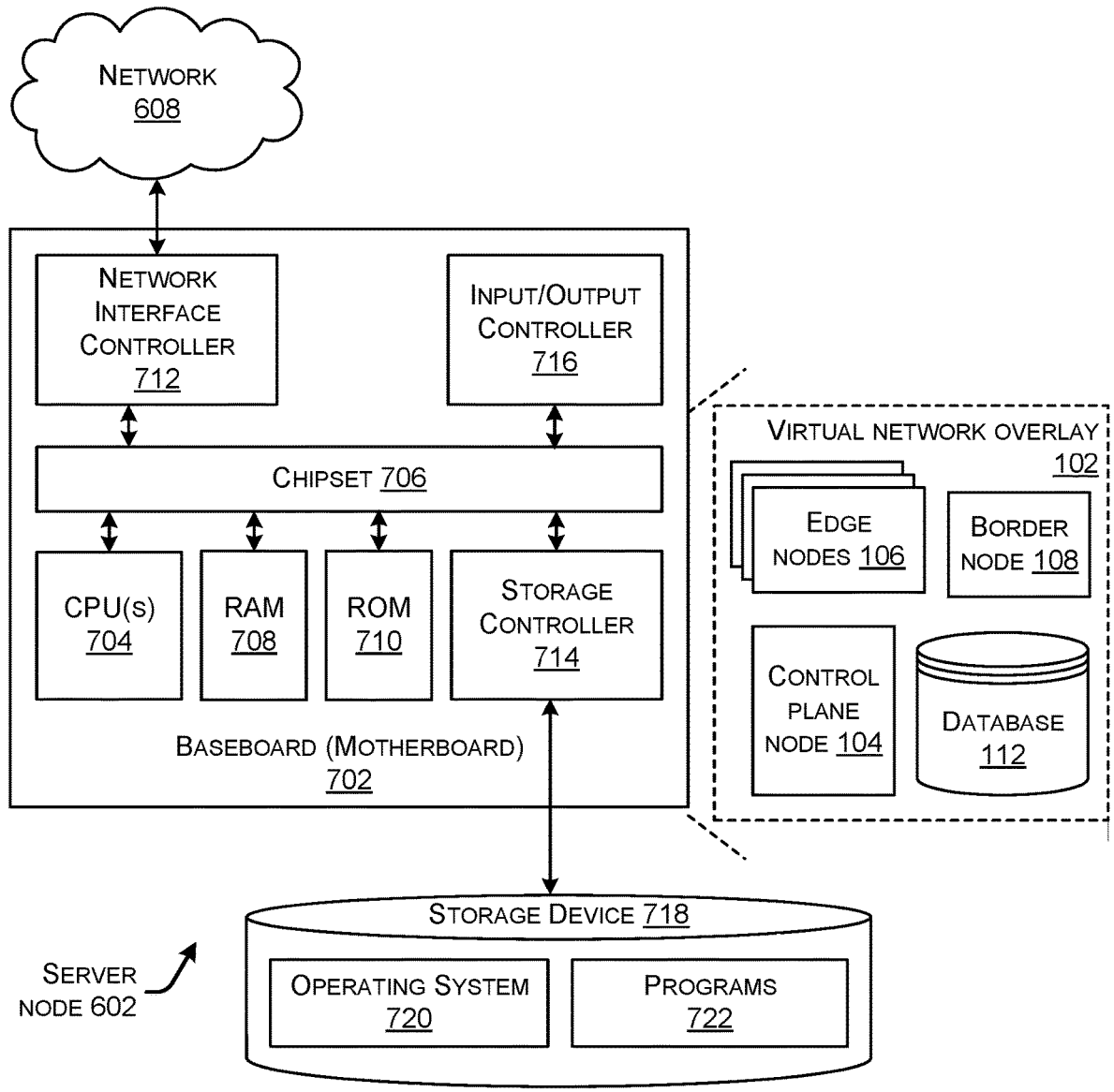
FIG. 7 shows an example computer architecture for a server node capable of executing program components for implementing the functionality described herein.

FIG. 7 shows an example computer architecture for a server node 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The server node 602 may, in some examples, correspond to a network node described herein.

The server node 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the server node 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the server node 602. The chipset 706 can further provide an interface to a computer-readable storage medium such as a read-only memory ("ROM") 710 or non-volatile RAM ("NVRAM") for storing basic routines that help to startup the server node 602 and to transfer information between the various components and devices. The ROM 710 or NVRAM can also store other software components necessary for the operation of the server node 602 in accordance with the configurations described herein.

The server node 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the server node 602 to other computing devices over the network 608. It should be appreciated that multiple NICs 712 can be present in the server node 602, connecting the server node to other types of networks and remote computer systems.

The server node 602 can be connected to a storage device 718 that provides non-volatile storage for the computer. The storage device 718 can store an operating system 720, programs 722, and data, which have been described in greater detail herein. The storage device 718 can be connected to the server node 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server node 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the server node 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server node 602 can further read information from the storage device 718 by detecting the physical states or characteristics of one or more particular locations within the physical storage units.

In addition to the mass storage device 718 described above, the server node 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the server node 602. In some examples, the operations performed by the virtual network overlay 102, and or any components included therein, may be supported by one or more devices similar to server node 602. Stated otherwise, some or all of the operations performed by the virtual network overlay 102, and or any components included therein, may be performed by one or more server node 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the server node 602. According to one embodiment, the operating system comprises the LINUX or NETBSD operating system and derivatives thereof. According to another embodiment, the operating system comprises the CISCO IOS operating system from CISCO SYSTEMS INC. of San Jose, California. According to further embodiments, the operating system can comprise the UNIX operating system or one of its variants. It should be appreciated that other operating systems can also be utilized. The storage device 718 can store other system or application programs and data utilized by the server node 602.

In one embodiment, the storage device 718 or other computer-readable storage media is encoded with computer-executable instructions which, when loaded into the server node 602, transform the computer from a general-purpose computing system into a special-purpose computer capable of implementing the embodiments described herein. These computer-executable instructions transform the server node 602 by specifying how the CPUs 704 transition between states, as described above. According to one embodiment, the server node 602 has access to computer-readable storage media storing computer-executable instructions which, when executed by the server node 602, perform the various processes described above with regard to FIGS. 1-5. The server node 602 can also include computer-readable storage media having instructions stored thereupon for performing any of the other computer-implemented operations described herein.

The server node 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the server node 602 might not include all of the components shown in FIG. 7, can include other components that are not explicitly shown in FIG. 7, or might utilize an architecture completely different than that shown in FIG. 7.

The server node 602 may support a virtualization layer 724 executing in the operating system 720. In some examples, the virtualization layer 724 may be supported by a hypervisor that provides one or more virtual machines running on the server node 602 to perform functions described herein. The virtualization layer 724 may generally support a virtual resource that performs at least portions of the techniques described herein, such as performing the functions of the virtual network overlay 102.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A physical server disposed in an underlay of physical servers that execute a virtual network overlay, the physical server comprising:
   one or more processors; and
   one or more non-transitory computer-readable media storing computer-executable instructions that, when executed by the one or more processors, cause the one or more processors to:
   establish, by a first edge node of the virtual network overlay, a connection to a client device having a device address;
   send, by the first edge node, a first registration message to a control plane node of the virtual network overlay;
   look up, by the control plane node, a network address translation (NAT) policy;
   assign, by the control plane node, a subnet address to the client device as a NAT address based on the NAT policy;
   record, by the control plane node, a first mapping and a second mapping between the device address and the assigned NAT address, each of the first mapping and the second mapping being associated with the first edge node;
   send, by the control plane node, a confirmation message to the first edge node indicating the first mapping and the second mapping between the device address and the NAT address;
   establish, by a second edge node of the virtual network overlay, a connection to the client device;
   send, by the second edge node, a second registration message to the control plane node, the first registration message and the second registration message respectively comprising a same Endpoint ID (EID) of the client device; and
   update, by the control plane node, each of the first mapping and the second mapping from being associated with the first edge node to being associated with the second edge node.

2. The physical server of claim 1, wherein the registration message is a Locator/ID Separator Protocol (LISP) registration request representing the edge node as an egress tunnel router (ETR) and the device address as an EID.

3. The physical server of claim 1, wherein the NAT policy specifies that NAT is applied to traffic between hosts addressed by private subnet addresses allocated to the virtual network overlay and hosts outside the network fabric.

4. The physical server of claim 1, wherein the NAT policy specifies that NAT is applied to traffic between hosts addressed by private subnet addresses of the network fabric and hosts outside the network fabric, and applied to traffic among hosts addressed by private subnet addresses of the network fabric.

5. The physical server of claim 1, wherein the NAT policy specifies that NAT is applied to traffic originating from subnet addresses not registered by LISP at the control plane node.

6. The physical server of claim 1, wherein the first mapping is a mapping from the device address as a key to the assigned NAT address, and the second mapping is a mapping from the assigned NAT address as a key to the device address.

7. The physical server of claim 1, wherein each of the first mapping and the second mapping is associated with the edge node.

8. A method comprising:
   executing a virtual network overlay on a physical server of an underlay of physical servers;
   establishing, by a first edge node of the virtual network overlay, a connection to a client device having a device address;
   sending, by the first edge node, a first registration message to a control plane node of the virtual network overlay;
   looking up, by the control plane node, a NAT policy;
   assigning, by the control plane node, a public subnet address to the client device as a NAT address based on the NAT policy;
   recording, by the control plane node, a first mapping and a second mapping between the device address and the assigned NAT address, each of the first mapping and the second mapping being associated with the first edge node;
   sending, by the control plane node, a confirmation message to the first edge node indicating the first mapping and the second mapping between the device address and the NAT address;
   establishing, by a second edge node of the virtual network overlay, a connection to the client device;
   sending, by the second edge node, a second registration message to the control plane node, the first registration message and the second registration message respectively comprising a same Endpoint ID (EID) of the client device; and
   updating, by the control plane node, each of the first mapping and the second mapping from being associated with the first edge node to being associated with the second edge node.

9. The method of claim 8, wherein the registration message is a Locator/ID Separator Protocol (LISP) registration request representing the edge node as an egress tunnel router (ETR) and the device address as an EID.

10. The method of claim 8, wherein the NAT policy specifies that NAT is applied to traffic between hosts addressed by private subnet addresses allocated to the virtual network overlay and hosts outside the network fabric.

11. The method of claim 8, wherein the NAT policy specifies that NAT is applied to traffic between hosts addressed by private subnet addresses of the network fabric and hosts outside the network fabric, and applied to traffic among hosts addressed by private subnet addresses of the network fabric.

12. The method of claim 8, wherein the NAT policy specifies that NAT is applied to traffic originating from subnet addresses not registered by LISP at the control plane node.

13. The method of claim 8, wherein the first mapping is a mapping from the device address as a key to the assigned NAT address, and the second mapping is a mapping from the assigned NAT address as a key to the device address.

14. A system comprising:
one or more processors; and
one or more non-transitory computer-readable media storing computer-executable instructions that, when executed by the one or more processors, cause the one or more processors to:
establish, by a first edge node of the virtual network overlay, a connection to a client device having a device address;
send, by the first edge node, a first registration message to a control plane node of the virtual network overlay;
look up, by the control plane node, a network address translation (NAT) policy;
assign, by the control plane node, a public subnet address to the client device as a NAT address based on the NAT policy;
record, by the control plane node, a first mapping and a second mapping between the device address and the assigned NAT address, each of the first mapping and the second mapping being associated with the first edge node;
send, by the control plane node, a confirmation message to the first edge node indicating the first mapping and the second mapping between the device address and the NAT address;
establish, by a second edge node of the virtual network overlay, a connection to the client device;
send, by the second edge node, a second registration message to the control plane node, the first registration message and the second registration message respectively comprising a same Endpoint ID (EID) of the client device; and
update, by the control plane node, each of the first mapping and the second mapping from being associated with the first edge node to being associated with the second edge node.

15. The system of claim 14, wherein the registration message is a Locator/ID Separator Protocol (LISP) registration request representing the edge node as an egress tunnel router (ETR) and the device address as an EID.

16. The system of claim 14, wherein the NAT policy specifies that NAT is applied to traffic between hosts addressed by private subnet addresses allocated to the virtual network overlay and hosts outside the network fabric.

17. The system of claim 14, wherein the NAT policy specifies that NAT is applied to traffic between hosts addressed by private subnet addresses of the network fabric and hosts outside the network fabric, and applied to traffic among hosts addressed by private subnet addresses of the network fabric.

18. The system of claim 14, wherein the NAT policy specifies that NAT is applied to traffic originating from subnet addresses not registered by LISP at the control plane node.

19. The system of claim 14, wherein the first mapping is a mapping from the device address as a key to the assigned NAT address, and the second mapping is a mapping from the assigned NAT address as a key to the device address.

20. The system of claim 14, wherein each of the first mapping and the second mapping is associated with the edge node.

* * * * *